Nov. 14, 1967  HIDEHISA HONDA ETAL  3,352,367
DEVICE FOR TILLING BENEATH THE TRANSMISSION
CASING OF A ROTARY CULTIVATOR
Original Filed Dec. 20, 1963
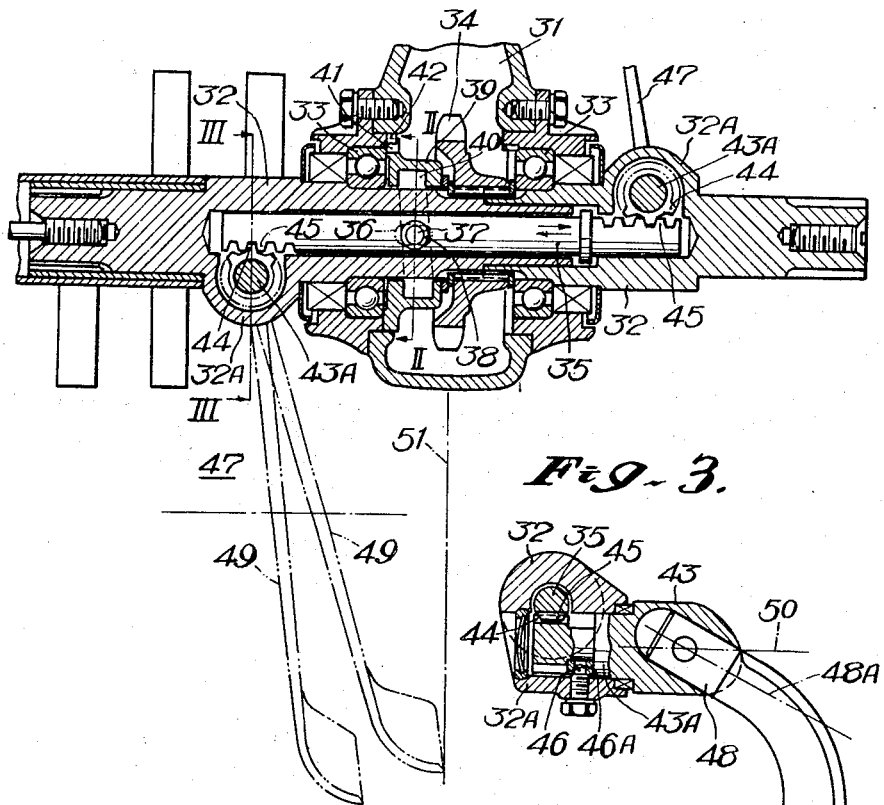
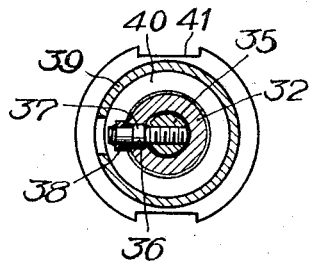
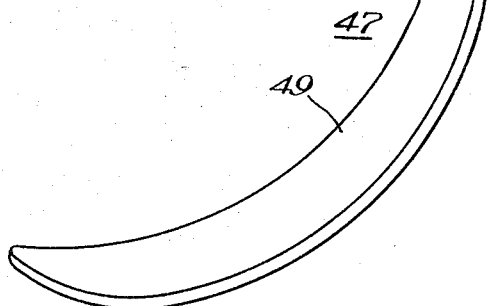
INVENTORS:
HIDEHISA HONDA
JUN SAKAI
BY E. M. Squire
ATTORNEY.

United States Patent Office 3,352,367
Patented Nov. 14, 1967

3,352,367
DEVICE FOR TILLING BENEATH THE TRANSMISSION CASING OF A ROTARY CULTIVATOR
Hidehisa Honda and Jun Sakai, Kita-Adachi-gun, Saitama-ken, Japan, assignors to Kabushiki Kaisha Honda Gijutsu Kenkyujo, Saitama-ken, Japan, a corporation of Japan
Original application Dec. 20, 1963, Ser. No. 332,143, now Patent No. 3,246,704, dated Apr. 19, 1966. Divided and this application Jan. 27, 1966, Ser. No. 547,138
Claims priority, application Japan, June 24, 1963, 38/45,515
4 Claims. (Cl. 172—96)

This application is a division of copending application Ser. No. 332,143, filed on Dec. 20, 1963, and now Patent No. 3,246,704, issued on Apr. 19, 1966.

This invention relates to rotary cultivators and particularly to those of the type including a transmission casing and a rotary shaft extending sidewise therefrom.

With rotary cultivators, it is well known that the tilling efficiency of the cultivator can be materially improved by use of additional rotary blades secured to the cultivator shaft and each having an elongated body portion extending sidewise from the base end of the blade.

The present invention is intended to provide an improved rotary cultivator of the type described which includes at least one rotary blade of the type described above and is capable of effectively tilling the field strip extending immediately beneath the transmission casing of the cultivator in operation and previously left untilled behind the cultivator.

According to one feature of the present invention, there is provided a rotary cultivator of the type described having a device for tilling beneath the transmission casing comprising at least one rockable shaft mounted on the rotary shaft of the cultivator adjacent to the transmission casing and a rotary blade including a base portion secured to said rockable shaft and an elongated body portion extending sidewise from said base portion, said base portion having an axis extending in the same direction as that of said rockable shaft or at a limited angle thereto.

A feature of the invention is the provision of an appropriate mechanism for forcibly rocking the rotary blade so that it works effectively beneath the transmission casing of the cultivator.

The present invention will now be described in further detail with reference to the accompanying drawings, which illustrate a preferred embodiment of the invention and in which:

FIG. 1 is a front elevation, in cross section, of an embodiment of the present invention;

FIG. 2 is a cross-sectional view taken along the line II—II in FIG. 1; and

FIG. 3 is a cross-sectional view taken along the line III—III in FIG. 1.

In the drawing, there is shown a cultivator including a device for positively pivoting the rotary blade for effective working on the untilled field strip. The cultivator has a transmission casing 31 and a rotary shaft 32 journaled in bearings 33. The cultivator shaft 32 has a sprocket wheel 34 mounted fast thereon and is driven from an appropriate power source in conventional manner through the medium of the sprocket wheel 34.

The rotary shaft 32 has an axial bore in which an actuator rod 35 is slidably fitted to rotate with the shaft. A radial pin 37 is secured to the rod midway of its length and carries a roller 38 which is slidably fitted in an elongated slot 36 formed in the adjacent wall of the shaft 32. A stationary cam ring 39 is mounted in the transmission casing 31 to surround the rotary shaft 32. Formed in the cam ring 39 is an annular camming groove 40 which opens radially inwardly to receive the roller 38 and is slightly inclined with respect to the plane extending at right angles to the axis of the rotary shaft. It will be noted that, as the shaft 32 rotates together with the actuator rod 35, the roller 38 on the latter is axially reciprocated by the camming groove 40 along which the roller slides. Accordingly, the actuator rod 35 is axially oscillated relative to the rotary shaft 32 while rotating together therewith. As shown, the cam ring 39 has notches 41 formed in its periphery to receive a lug 42 formed integrally with the transmission casing 31 and is thus held against rotation relative to the transmission casing 31.

Formed on the rotary shaft 32 on the opposite sides of the transmission casing 31 are bearing bosses 32A in which respective pivot shafts 43A are journaled to extend at right angles to the axis of the rotary shaft 32. The pivot shafts 43A are each formed at one end with a seat 43 exteriorly of the boss 32A and to which seat a rotary tilling blade 47 is secured. The other end of the pivot shaft 43A, which is located in the bearing boss 32A, is formed as a gear having teeth 44. The actuator rod 35 is formed at opposite ends with racks 45, each of which is in mesh with the gear teeth 44 on the adjacent pivot shaft 43A. A pin 46 is provided in the boss 32A to retain the pivot shaft 43A in the boss and carries a roller 46A. The tilling blade 47 has a base portion 48 secured to the seat 43, formed on each of the shafts 43A, and an elongated central body portion 49 extending outwardly from the base portion 48. As observed in FIG. 3, the axis 48A of the base portion 48 of the rotary blade is at an angle of approximately 30 degrees to the axis 50 of the seat 43. Obviously, these axes may be aligned when desired.

With this arrangement, rotation of the rotary shaft 32 causes both rotation and pivotal movement of rotary blades 47. It is to be understood that, as the actuator rod 35 is axially oscillated, the blades are alternately swung inwardly to move their tip portions to a point close to the medial plane 51 of the transmission casing, as shown in FIG. 1, when the blades are turned downward to engage the soil. Thus, the blades are effective to till the field strip extending beneath the transmission casing. This device is advantageous in that it is very sturdy in construction and functions in a positive manner.

While we have shown and described what we believe to be the best embodiment of our invention, it will be apparent to those skilled in the art that various changes and modifications may be made therein without departing from the spirit and scope of the invention as defined in the appended claims.

What is claimed is:

1. Cultivator apparatus of the class described, comprising: an elongated cultivator shaft for supporting cultivator blades, said shaft extending transversely of the direction of travel of the cultivator and above the ground being cultivated; a transmission for driving said shaft in rotation about its longitudinal axis during said travel of said cultivator, said transmission including a casing surrounding and enclosing central axially spaced portions of said shaft; a blade support member connected to said shaft for rotation therewith immediately adjacent to said casing; an elongated cultivator blade having a portion extending transversely of said shaft and including a free end portion engageable with the ground being cultivated, the other end portion being connected to said support member for pivotal movement about an axis spaced from and effectively perpendicular to the rotational axis of said shaft; cam means within said casing and driven along with said shaft; and axially slidable rack and pinion means within said shaft, said rack and pinion means driving said other end portion of said blade to cause said pivotal movement, said pivotal movement positioning said blade beneath said transmission while said blade is in engagement with said ground and moving said blade to clear otherwise interfering portions of said cultivator apparatus while said blade is out of engagement with said ground.

2. Cultivator apparatus according to claim 1, wherein said rack and pinion means comprises a rack member coaxial with said shaft.

3. Apparatus according to claim 1, further comprising an additional blade support member connected to said shaft for rotation therewith immediately adjacent to said casing at the side thereof remote from said first-named blade support member; a further elongated cultivator blade having a portion extending transversely of said shaft and including a free end portion engageable with the ground being cultivated, the other end portion of said further cultivator blade being connected to said additional support member for pivotal movement about a second axis parallel to said first-named axis, said second axis being spaced from said rotational axis of said shaft oppositely to said first-named axis of pivotal movement, said two cultivator blades being angularly displaced by 180° with respect to each other around said shaft; and in which said rack and pinion means simultaneously drives said other end portions of both blades to cause said pivotal movements thereof, said pivotal movements positioning each blade successively beneath said transmission while the particular blade is in engagement with said ground and moving each blade successively to said otherwise interfering portions of said cultivator apparatus while the particular blade is out of engagement with said ground.

4. Cultivator apparatus according to claim 3, wherein said rack and pinion means comprises a rack member coaxial with said shaft and having two axially spaced sets of teeth formed thereon, one set of teeth being on one side of said rack member for driving said first-named cultivator blade and the other set being on the opposite side of said rack member for driving said further cultivator blade.

References Cited
UNITED STATES PATENTS

| | | | |
|---|---|---|---|
| 3,012,616 | 12/1961 | Horowitz | 172—94 |
| 3,087,555 | 4/1963 | Lester | 172—94 |

ABRAHAM G. STONE, *Primary Examiner.*

WILLIAM A. SMITH III, *Examiner.*

J. R. OAKS, *Assistant Examiner.*